United States Patent [19]

Chiu

[11] Patent Number: 4,855,172
[45] Date of Patent: Aug. 8, 1989

[54] ADHESIVE COMPOSITION LAMINATE WITH BUTYL RUBBER

[76] Inventor: Jessie T. Chiu, 1811–164th Ave., NE., Bellevue, Wash. 98008

[21] Appl. No.: 110,633

[22] Filed: Oct. 16, 1987

Related U.S. Application Data

[60] Continuation of Ser. No. 8,775, Jan. 30, 1987, abandoned, which is a division of Ser. No. 771,250, Aug. 30, 1985, abandoned, which is a continuation of Ser. No. 482,220, Apr. 5, 1983, abandoned.

[51] Int. Cl.$^4$ .............................................. B32B 3/02
[52] U.S. Cl. ..................................... 428/57; 52/409;
156/334; 156/71; 156/230; 156/304.1; 428/147; 428/517; 428/521
[58] Field of Search ..................... 428/40, 54, 57, 141, 428/147, 517, 521; 52/58, 408, 409

[56] References Cited

U.S. PATENT DOCUMENTS

| 3,268,495 | 8/1966 | Convert . | |
|---|---|---|---|
| 4,039,706 | 8/1977 | Tajima | 428/40 |
| 4,248,926 | 2/1981 | Tajima | 428/253 |
| 4,461,875 | 7/1984 | Crepeau | 525/348 |

FOREIGN PATENT DOCUMENTS

| 584815 | 1/1947 | United Kingdom . |
| 591444 | 8/1947 | United Kingdom . |
| 802546 | 10/1958 | United Kingdom . |

Primary Examiner—Christopher Henderson

[57] ABSTRACT

A roofing adhesive particularly suited for use in connection with membrane roofing materials such as EPDM or neoprene is preferably compounded from butyl rubber, a cross-linking system for the butyl rubber and a tackifier. The tensile strength, elongation, modulus at 300% elongation and modulus at failure of the composition are adjusted within range by choice of components and concentration. The adhesive composition may preferably be formed into a tape for joining sheets of the membrane roofing material.

11 Claims, 3 Drawing Sheets

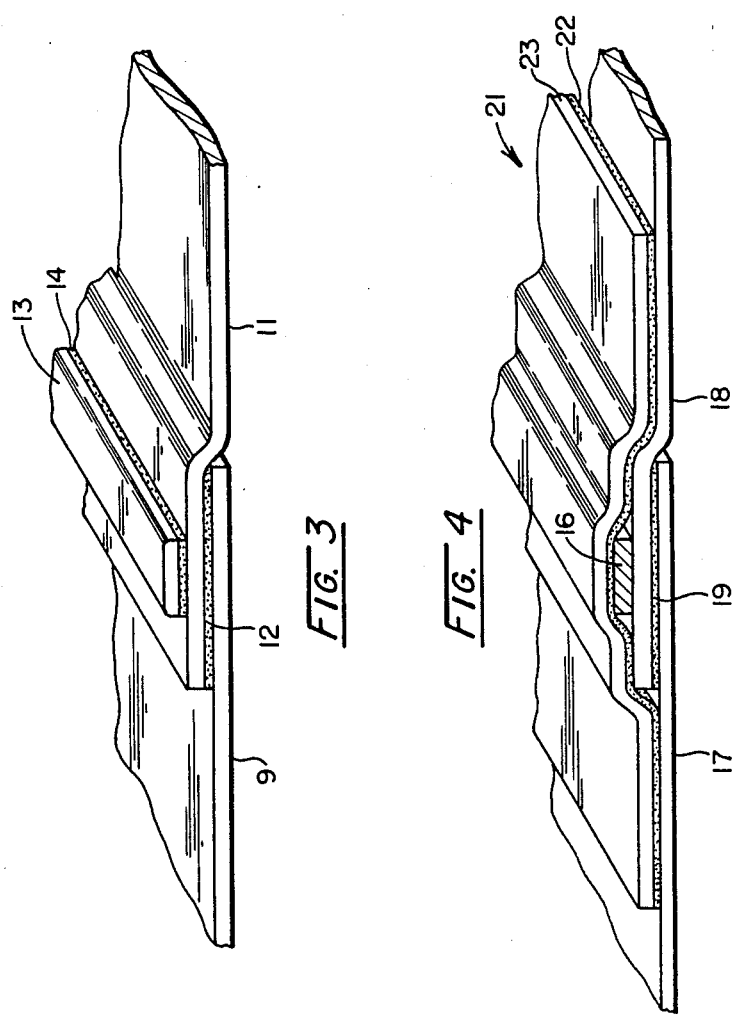

ADHESIVE COMPOSITION LAMINATE WITH BUTYL RUBBER

This is a continuation of copending application Ser. No. 008,775, filed Jan. 30, 1987, now abandoned, which is a division of abandoned application Ser. No. 771,250, filed Aug. 30, 1985, which is a continuation of abandoned application Ser. No. 482,220, filed Apr. 5, 1983.

FIELD OF THE INVENTION

The present invention relates to the field of adhesive compositions and more particularly to the field of adhesive compositions for use in connection with membrane roofing materials such as EPDM (ethylene propylene diene monomer) and neoprene. The adhesive composition may be prepared in a single layer to form a one ply tape or may be applied to a strip of membrane roofing material to form a cover strip.

BACKGROUND OF THE INVENTION

In the field of roofing, increasing use is being made of membrane roofing materials such as EPDM (ethylene propylene diene monomer) and neoprene. Sheets of such materials are generally prepared by a double calendering process in which two sheets of uncured material are pressed together by rollers to form a single sheet. The composite single sheet is then generally coated with talc, wound into a roll and cured.

Although this calendering process virtually eliminates leakage problems arising from small defects such as pinholes in either of the two original sheets, it increases the cost of the finished product.

The membrane roofing materials are available in sheets of standard widths. Successive sheets of the membrane roofing material are spliced together to form a continuous sheet which covers the roof. Lap joints are typically used to splice adjacent sheets of roofing material. To form such a joint, sheets of the material are positioned adjacent to one another such that they overlap about three inches along the edges to be joined. The edge of the overlying sheet is then folded back such that the contact surfaces of the edges are exposed. The term "overlap" as used herein and in the claims below includes sheets that are overlapped but folded back as well as sheets which are overlapped and not folded back. The overlapping surfaces are then cleaned with a solvent such as hexane, toluene or white gasoline to remove talc or other foreign material which might impair the strength of the bond. A contact adhesive is then applied to the contact surfaces and allowed to dry. The sheets are then repositioned in overlapping relation and the overlapping areas are pressed together by a roller which is rolled along the joint.

The strength of the lap joint may be improved by use of a primer. Such primer is best applied to the overlapping surfaces of the membrane roofing material after cleaning with solvent but before application of the contact adhesive. The primer may also be used by scrubbing or brushing it onto the overlapping surfaces without cleaning.

This method of joining sheets of roofing material is extremely slow and labor intensive. In addition, the lap joint formed by this method must be sealed with a caulking compound to prevent penetration of moisture along the seam.

An alternate method of joining adjacent sheets of membrane roofing material employs tape composed of a single layer of an uncured elastomeric material which cures in place after application. This tape is applied along the edge of one of the sheets to be joined and the two sheets are then overlapped. A roller is rolled along the joint to press the sheets into engagement with the tape. The tape, however, has a limited shelf life and may even cure before it can be used if left for prolonged periods on a hot roof or in an excessively warm storeroom.

Once the sheets of membrane roofing material have been joined to cover the roof, the membrane must be fixed in position. The spliced membrane may be held in position by means of fastening bars which are elongated strips of materials such as plastic or metal. The fastening bars are positioned in the desired location, which may overlay a lap joint, and fastened to the underlying roof structure by fasteners such as screws which extend through the membrane roofing material. In order to prevent moisture seepage, a layer of caulking material is applied to the bottom of the fastening bar prior to fastening it in place, and the heads of the fasteners are caulked after they have been inserted through the fastening bar. Some roofing manufacturers have also attempted to prevent leakage by covering the fastening bar with a strip of membrane roofing material applied with the contact cement and sealed with the roofing caulk as described above with respect to the splicing of the membrane.

Emergency repairs of membrane roofing are frequently accomplished by application of a solution of an asphalt-type material. A permanent repair may later be accomplished by removing the patched section of the membrane roofing material and splicing a new piece of material in its place.

SUMMARY OF THE INVENTION

It has been discovered that a superior roofing adhesive can be formulated by adjusting the composition thereof such that several key properties are controlled. These properties include the tensile strength, elongation, modulus at 300% elongation and modulus at failure of the adhesive. The adhesion of the composition to the roofing materials, as measured by the peel strength and shear strength of the composition must likewise be controlled.

Tensile strength refers to the maximum stress (force per unit area) that a specimen of adhesive material can withstand before rupturing. Elongation measures the relative increase in length of a specimen of material at the point of rupture. The modulus at 300% elongation is the force required to stretch a sample of the adhesive to an elongation of 300% divided by the elongation of the sample expressed as a decimal rather than as a percentage. The modulus at failure is the tensile strength divided by the elongation.

Adhesives according to the present invention are compounded to have a tensile strength of at least 50 psi, an elongation of at least 600%, a modulus at 300% elongation of less than 12, and a modulus at failure of less than 20. Preferably, however, the adhesives are compounded to have a tensile strength of at least 60 psi, an elongation of at least 800% and preferably more than 1000%, a modulus at 300% elongation of at most 8, and a modulus at failure of at most 16. The adhesive composition also preferably has a peel strength of at least 2 pounds per inch and a sheer strength of at least 15 psi.

Adhesives according to the present invention comprise cured butyl rubbers which preferably are present only in the form of a copolymer having a viscosity average molecular weight greater than 100,000, in combination with appropriate tackifiers, in which the tensile strength and other physical properties have been adjusted as discussed. In general, tensile strength and elongation may most readily be controlled by adjusting the fraction of butyl rubber in the total composition, the amount of cross-linking agent used, the amount of reinforcer used, the molecular weight and degree of mole unsaturation of the butyl rubber, and to a lesser extent the tackifiers and processing methods used. Such adhesives may be formulated by adjusting the concentration of the butyl rubber to comprise about 13–40% by weight of the total composition excluding the cross-linking agents, by using a butyl rubber having a mole percent unsaturation between about 0.5 and 2.5 and a molecular weight of about 100,000–450,000, and by using between about 0.5–6 phr of a quinoid cross-linking agent and at least about 2 phr of carbon black. Adhesives having tensile strengths and other physical properties in the ranges set forth above may also be formulated by adjusting the butyl rubber to comprise about 13–50% by weight of the total composition less the cross-linking agents by using a butyl rubber having a mole % unsaturation between about 0.5–2.5 and a molecular weight of about 100,000–450,000, and by using between about 5–25 phr of a bromomethylated phenolic resin curing agent and at least 3 phr of zinc oxide.

Benzoyl peroxide is a preferred oxidizer which may be used as the activator for the cross-linking of the butyl rubber by means of the quinone dioxime curing system. When a adhesive composition is processed at elevated temperatures, however, as may be desired to reduce its viscosity, benzoyl peroxide causes extremely rapid cross-linking of the butyl rubber, resulting in an almost immediate gelling of the adhesive and making application and handling thereof more difficult. Oxidizing agents of lesser activity, such as t-butyl perbenzoate or other peroxy esters, lead dioxide and diacyl peroxides may be used to increase the curing rate, including the gel time of the sealant composition, but the high temperature stability and hence the resistance to aging of sealant compositions cured with these compounds may be reduced. In order to overcome these difficulties, two oxidizing agents capable of activating the cross-linking of the butyl rubber may be used. In such case, one of the components of the activator system should be of relatively higher activity and the second should be of lesser activity. By adjusting the relative concentrations of the two oxidizing agents, the gel time and curing time of the adhesive can be controlled to facilitate its application. Zinc oxide and sulfur may be used in combination in the adhesive to provide superior high temperature stability and aging characteristics.

Although the addition of either zinc oxide or sulfur alone will provide some improvement in the high temperature stability of the adhesive compositions, their combined use provides an increase in stability of the adhesive which is greater than that expected from their independent use. Preferably, concentrations of 3% zinc oxide in conjunction with sulfur or a second sulfur constituent are used to improve the high temperature stability of the adhesive.

The adhesive is used by preparing it as a thin tape composed of adhesive material. Alternately, a layer of the adhesive material may be applied to a thin strip of roofing material or other membrane material to form a cover strip. In either of these two embodiments, the adhesive layer may be backed with a standard silicone coated release paper and rolled into a roll for transportation or storage. The present invention thus provides an adhesive composition which is easy to transport and store, which has a long shelf life, which is easy to use, and which may be used to form an adhesive tape or two-ply cover strip. In use, the adhesive composition provides an initially strong, water resistant seal between sheets of the membrane roofing material, is usable in a variety of weather conditions, is stable at the elevated temperatures encountered in roofing applications, does not become brittle at low temperatures, and remains sufficiently strong and flexible to withstand the expansion and contraction of the roof. In addition, the present adhesive does not emit solvents during use which may be detrimental to laborers.

DETAILED DESCRIPTION OF THE DRAWINGS

FIG. 3 is a perspective view of sheets of membrane roofing material which have been spliced using the adhesive tape of the present invention and illustrates another method of using a fastening bar with the present adhesive composition.

FIG. 4 is a perspective view of a sheet of membrane roofing material which has been spliced using the adhesive tape of the present invention and illustrates one method of using the two-ply cover strip with a fastening bar.

DETAILED DESCRIPTION OF THE PREFERRED EMBODIMENT

Figure 1:
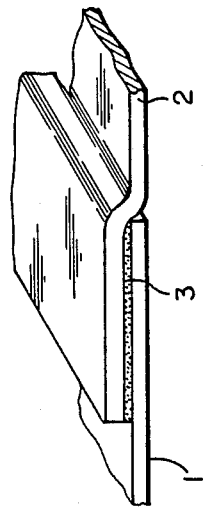
FIG. 1 is a perspective view of sheets of membrane roofing material which have been spliced using the adhesive tape of the present invention.

The copolymer network which provides the strength and continuity of the adhesive compositions of the present invention is comprised of cured butyl rubber. Butyl rubber is intended to include copolymers of 96–99.5 wt. % isobutylene and 4–0.5 wt. % isoprene (Butyl IIR) as well as other rubbery copolymers of a major proportion (i.e., over 50% by weight) of an isoolefin having from 4 to 7 carbon atoms with a minor proportion by weight of an open chain conjugated diolefin having from 4 to 8 carbon atoms. The copolymer may consist of from 70 to 99.5% by weight of an isomonoolefin such as isobutylene or ethyl methyl ethylene copolymerized with from 0.5 to 30% by weight of an open chain conjugated diolefin such as isoprene; butadiene -1, 3; piperylene; 2,3-dimethyl-butadiene -,3; 1,2-dimethyl-butadiene -1,3 (3-methyl pentadiene -1,3); 1,3 -dimethyl butadiene -1,3; 1-ethyl butadiene -1,3 (hexadiene -1,3); 1,4-dimethyl butadiene-1, (hexadiene -2,4); the copolymerization being effected by the usual manner of copolymerizing such monomeric materials. "Butyl rubber" as used herein also includes halogenated butyl rubber, of which chlorobutyl and bromobutyl are the best known varieties. The halogen is generally believed to enter the butyl rubber molecule by substitution at the allylic position in the diolefin unit. Typical chlorobutyl rubbers have about 1.0–1.5 weight per cent chlorine. "Butyl rubber" also includes those varieties of butyl rubber in which conjugated diene functionality has been added in the linear backbone at the diolefin units. Such conjugated diene butyls are described in U.S. Pat. No. 3,816,371.

The adhesive compositions of the present invention is preferably formulated using any of the standard high molecular weight grades of butyl rubber. Such grades have viscosity average molecular weights in excess of 100,000, and most commonly in the range 300,000–450,000. They are to be distinguished from the low molecular weight butyl grades, which have viscosity average molecular weights on the order of one-tenth of the high weight grades. Representative examples of high weight butyl grades are Butyl 065, Butyl 165, Butyl 268, Butyl 365, Butyl 077, Chlorobutyl 1066 and Chlorobutyl 1068, all available from the Exxon Oil Company, and BUCAR 1000 NS, BUCAR 5000 NS, BUCAR 5000 S and BUCAR 6000 NS, all available from Cities Service Oil Company. While the use of butyl rubber having a molecular weight in excess of about 450,000 will not detract from the qualities of the adhesive, such butyl rubber is comparatively difficult to dissolve and combine with other constituents. Thus the preferred weight range for the high molecular weight butyl rubber is from 100,000 to about 450,000. Furthermore, butyl rubber having molecular weights in the range of 300,000–450,000 have been found particularly useful for formulating adhesives having desirable tensile and elongation properties, and are especially preferred.

Cross-linking of the butyl rubber may be effected by any of the well-known curing systems, including sulfur and sulfur containing systems, quinoid systems, and phenolic resin systems. For halogenated butyl, additional useable curing agents include primary amines and diamines, secondary diamines, zinc oxide combined with alkyl dithiol carbamates such as tetramethyl thiuram disulfide, and 1,1-1,3 dialkyl thioureas. For butyl containing conjugated diene functionality, additional useable curing agents include poly-functional dieneophiles, such as ethylene glycol dimethacrylate and trimethylol propane trimethacrylate.

Although butyl rubber may be cured using a vulcanization process (sulfur and accelerators such as mercaptobenzotiazole), such a cure results in a rubber that over time is subject to degradation caused by oxygen or ultraviolet radiation. Such degradation may be partially prevented through the use of antioxidants, such as di-phenyl - p - phenylene-diamine, phenylbeta-naphthylamine and hydroquinone, and antiozonants, such as N,N'-di (2-octyl) - p - phenylenediamine and N-(1-3-demethyl-butyl) -N'- phenyl-p-phenylenediamine. Nevertheless, the characteristics of the resulting adhesive may change sufficiently over time to make quinoid and phenolic resin curing systems preferable to vulcanization, where the adhesive must be capable of lasting years in a harsh environment.

Quinoid cures depend on cross-linking through the nitroso groups of aromatic nitroso compounds. In the quinoid curing system, p-quinone dioxime and p,p-dibenzoylquinone dioxime are preferred as the curing agents. Other suitable curing agents include dibenzoyl-p-quinone dioxime, p-dinitrosobenzene and N-methyl-N,4-dinitrosoanilene, the latter two being available on a clay base as "Polyac" from E. I. duPont de Nemours & Co. and as "Elastopar" from Monsanto Chemical Co., respectively. The cross-linking activators which may be employed in the sealant composition include inorganic peroxides, organic peroxides (including diaroyl peroxides, diacyl peroxides and peroxyesters) and polysulfides. Exemplary are lead peroxide, zinc peroxide, barium peroxide, copper peroxide, potassium peroxide, silver peroxide, sodium peroxide, calcium peroxide; metallic peroxyborates, peroxychromates, peroxycolumbates, peroxydicarbonates, peroxydiphosphates, peroxydisulfates, peroxygermanates, peroxymolybdates, peroxynitrates, magnesium peroxide, sodium pyrophosphate peroxide, and the like; the organic peroxides such as lauryl peroxide, benzoyl peroxide, 2,4-dichlorobenzoyl peroxide, t-butyl peroxybenzoate, dibenzoyl peroxide, bis (p-monomethoxy-benzoyl peroxide, bis (p-nitrobenzoyl) peroxide, and phenacetyl peroxide; the metallic polysulfides such as calcium polysulfide, sodium polysulfide, potassium polysulfide, barium polysulfide and the like, some sulfur bearing organic compounds such as disclosed in U.S. Pat. No. 2,619,481, and the organic polysulfides, which possess the general formula $R-(S)_x-R$ where R is a hydrocarbon group and x is a number from 2 to 4. The actual cross-linking agent is believed to be the oxidation product of quinone dioxime, p-dinitroso benzene.

The quinoid curing agent/cross-linking activator combination which has been found to result in the shortest gel time is the p-quinone dioxime/benzoyl peroxide combination. The preferred concentration of p-quinone dioxime is 0.5–6 phr. The preferred concentration of benzoyl peroxide is 1.5–18 phr. Accelerators may be employed as appropriate. For example, cobalt napthenate may be used in combination with t-butyl peroxybenzoate, and chloranil (2,3,5,6-tetrachloro-1,4-benzoquinone) may be used in combination with t-butyl peroxybenzoate or benzoyl peroxide.

At higher temperatures, however, the use of benzoyl peroxide as the cross-link activator causes extremely rapid gelling of the adhesive. The gel time of the adhesive is the time required for the cross-linking reaction between the butyl rubber and the cross-linking agent to proceed to the point that it has become extremely viscous and no longer flows at a perceptible rate.

In order to facilitate handling of the adhesive it may be desirable to adjust the gel rate by using a less active oxidizing agent, such as t-butyl perbenzoate or other peroxy esters, as a part of the curing system. Such oxidizers can be mixed with benzoyl peroxide in varying amounts to adjust the gel time and to permit the mixing and handling at higher temperatures. By adjusting the concentration of these two activators, a relatively short get time can be obtained without an overly rapid curing of the adhesive. This occurs because the benzoyl peroxide initially causes rapid cross-linking under the elevated temperatures, but because of its lowered concentration does not complete the gelling and curing. The relatively less active t-butyl perbenzoate then completes the curing over a longer time span. By adjusting the relative concentrations of the two oxidizing agents, the sealant can be compounded to get at a sufficiently rapid rate to a consistency which prevents running and yet remain fluid long enough to permit easy handling.

The high temperature stability of the adhesive composition and hence the resistance to aging can be greatly improved by the addition of zinc oxide and sulfur thereto. Although sulfur may be used to cure butyl rubber by vulcanization, it does not serve as such in the present invention since the adhesive is not heated during the curing process to a temperature sufficient to cause any appreciable sulfur cross-linking.

Preferably, the zinc oxide is used in an amount not less than 1% by weight of the adhesive composition. As zinc oxide is a suitable filler material, it may be added in any amount greater than the 1% minimum which does not adversely affect the characteristics of the adhesive. The sulfur should be added in concentrations not less than 0.5–1.0 parts per 100 parts of butyl rubber. Sulfur-containing compounds may also be used as the sulfur constituent in lieu of or in combination with the sulfur. These sulfur constituents should be used in like concentrations to that suitable for sulfur with adjustments made for their increased molecular weight and the number of sulfur-bearing functional groups per molecule. In addition to sulfur, suitable sulfur compounds which may be used as sulfur constituents of the adhesive composition include benzothiazyl disulfide mercaptobenzothiazole and its derivatives and salts, dithiocarbamic acid and its derivatives and salts, tetraethylthiuram disulfide, tetramethylthiuram monosulfide, zinc dibutyldithiocarbamate, tellurium diethyldithiocarbamate, dipentamethylenethiuram tetrasulfide, and thioureas. Materials which provide sulfur during the cross-linking or aging processes may also be used. Such compounds include aminodisulfides, such as dimorpholene disulfide, tetramethylthiuram trisulfide and polysulfide, polymeric alkylphenol sulfides of sulfur rank equal to or greater than 3, and alkyl or aryl polysulfides of sulfur rank equal to or greater than 3. In general, vulcanization accelerators and materials which provide sulfur either by themselves or through interaction with other materials are usable as a sulfur constituent of the adhesive.

The use of zinc oxide, sulfur or a sulfur-bearing compound alone, as described above, will result in the improvement of the high temperature stability of the adhesive. The combined use of the zinc oxide and sulfur or a sulfur compound, however, results in improvements in the stability which is greater than that expected from the use of zinc oxide, sulfur or a sulfur compound alone. The high temperature stability can be even further improved by use of a second sulfur-containing compound, such as benzothiazyl disulfide in conjunction with sulfur.

Although discussed herein with respect to peroxide activated cross-linking reactions, it is believed that the use of zinc oxide and sulfur will also improve the stability of adhesives prepared using the phenolic resin curing system described herein.

The phenolic resins which may be used as curing agents in this invention include halomethylated alkyl phenolic resins, methylol phenolformaldehyde resins, and related species. Bromomethyl alkyl phenolic resins available from Schenectady Chemicals, Inc. under the tradenames CRJ-328 and SP-1056 are suitable. The preferred concentration of phenolic resin is 5–25 phr. Such resins do not require the use of activators.

The compositions of the present invention includes one or more tackifying agents which enable the composition to adhere to the tire, to a puncturing object, and to self-heal over a puncture hole after the puncturing object has been removed. In general, any tackifying agent compatible with a butyl rubber system may be used. Such agents include polybutenes, polypropenes, paraffinic oils, petrolatum, phthalates, and a number of resins including polyterpenes, terpene-phenolics, blocked-phenolics, modified rosin and rosin esters, and hydrocarbon resins. Preferred tackifiers are polyisobutylenes and hydrocarbon or phenolic resins.

The kind and quantity of tackifiers used should be chosen to provide adequate adhesion and plasticity across the anticipated range of temperatures to which the adhesive will be exposed. Of the preferred tackifiers listed with respect to the sealant composition, the polybutene sold under the trademark H-300 by AMOCO and the phenolic tackifier sold by Schenectady Chemicals, Inc. under the trademark SP 1068 are especially preferred.

The adhesive compositions of the present invention may include one or more reinforcing agents or fillers. For compositions cured by a quinoid curing system, one of the reinforcing agents should be finely divided carbon. Carbon, such as carbon black, provides reaction sites for the quinoid curing process, and should comprise at least 2 parts of the adhesive by weight for each 100 parts of butyl rubber. Preferred concentrations of carbon black are 6 phr or greater. The substance comprising the remainder of the reinforcing agent may either be carbon black or some other suitable substance selected on the basis of the desired color of the adhesive. For compositions cured by a phenolic resin curing agent, one of the reinforcing agents must be at least 3 phr of zinc oxide. The preferred concentration of zinc oxide is 5–30 phr. Carbon black may also be used with compositions cured by means of phenolic resins, but its presence is not required. Other well-known reinforcing agents and fillers for butyl rubbers include aluminum hydrate, lithopone, whiting, clays, hydrated silicas, calcium silicates, silicoaluminates, magnesium oxide, and magnesium carbonate.

The adhesive composition also includes one or more fillers as described with respect to the sealant composition. If carbon black or zinc oxide is used in connection with a quinoid or phenolic resin curing system, or for improving high temperature stability, such carbon black or zinc oxide also serves as a part of the filler material.

To aid in maintaining sufficient tackiness and thermal stability at elevated temperatures, the adhesive compositions of the present invention may include a thermoplastic and elastomeric partially-hydrogenated block copolymer up to about 10 wt. % of the composition, the block copolymer having a general configuration of A—(B—A)$_{1-5}$ wherein prior to hydrogenation each A is a monovinyl arene polymer block and each B is a conjugated diene polymer block. Typical A monomers are styrene, alpha methyl styrene and ring alkylated styrenes. Typical B monomers are butadiene and isoprene. The A blocks make up the end groups and typically comprise about one third of the copolymer by weight, and the B blocks make up the mid groups and the balance of the copolymer. The copolymer is partially hydrogenated so that the conjugated diene block segments are substantially fully saturated. The monovinyl arene polymer block segments are not appreciably saturated. Hydrogenation in this fashion enhances the utility of the block copolymer as an oxidation and high temperature-degradation resistant constituent of the adhesive composition. The average molecular weight of the copolymer is in the range of about 60,000 to 400,000. Block copolymers of this type are described in U.S. Pat. No. 3,595,942.

Adhesive compositions according to the present invention are compounded by selecting with the exception the components and adjusting their concentrations such that the adhesive has a tensile strength of at least 50 psi, an elongation of at least 600%, a modulus at 300% elongation of less than 12, and a modulus at failure of less than 20. Preferably, however, the adhesive is compounded to have a tensile strength of at least 60 psi, an elongation of at least 800% and preferably more than 1000%, a modulus at 300% elongation of at most 8, and a modulus at failure of at most 16.

If the tensile strength of the adhesive is insufficient, it may be subject to tearing or shearing and may thus fail in use. The limit on the elongation of the adhesive relates to the ability of the adhesive to conform to irregular surfaces, as may be encountered when the adhesive is applied over a lap joint or fastening bar. If the sealant has an inadequate elongation, it may pull away from the irregular surface, resulting in leaking of the roof. The modulus at 300% elongation is a function of the force necessary to stretch the adhesive to an elongation of 300%. As such, if the modulus is too high, very small deflections of the membrane roofing material may generate excessive forces in the adhesive. Adhesives with a high modulus at 300% elongation further may be unable to maintain adhesion over irregular surfaces.

Tensile strength and elongation of the adhesive may be adjusted as described in connection with the examples herein. Generally, changes which affect the tensile strength and elongation also affect the modulus at 300% elongation and the modulus at failure. For example, the tensile strength of the sealant and adhesive described herein may be increased by increasing the cross-link density. A large increase in the cross-link density, however, will increase both the modulus at 300% elongation and the modulus at failure. Changes to the kind and quantity of tackifiers also affect the tensile strength, elongation, modulus at 300% elongation, and modulus at failure as is demonstrated by the examples herein.

In addition to the required tensile strength, elongation, modulus at 300% elongation, and modulus at failure, the adhesive should also be compounded to have a shear strength of greater than 15 psi and a peel strength greater than two pounds per inch at 70° F. The shear strength and peel strength relate to the ability of the adhesive to adhere to an object such as membrane roofing material and are related to the amounts and kinds of tackifiers used.

Tensile strength is the stress per unit area that a sample of adhesive can withstand before rupturing. As used herein, tensile strength is determined by first curing a sample of the adhesive in a thin sheet. Dumbell shaped specimens of the adhesive are then cut using ASTM die "D", and the dimensions of the dumbell shaped specimen are determined. The speciment is then placed in a conventional Dillon tensile testing apparatus having jaws which grip it at its wider end portions, and the specimen is stretched at a cross-head speed of 10 inches per minute until rupture. The tensile strength is the force at rupture divided by the initial cross sectional area of the narrow portion of the specimen.

Elongation, as used herein, is determined by a procedure identical to that for tensile strength. The elongation, expressed as a percentage, is calculated by subtracting the initial length of the specimen from its length at rupture, multiplying by 100, dividing by the initial length, and then if necessary by multiplying the result by a correction factor which compensates for any material which may have been pulled out of the jaws gripping each end of the specimen. The initial and final rupture lengths are determined by measuring the distances between the jaws. Thus the specimen being elongated includes not only the narrow, central portion but also some of the wider end portions of the specimen.

The modulus of the adhesive composition at various elongations is also determined by a procedure similar to that for determining tensile strength. The modulus is equal to the force required to stretch the sample to a predetermined elongation divided by the elongation expressed as a decimal ratio rather than as a percentage. The modulus at failure is thus the tensile strength divided by the final elongation.

The shear strength of the adhesive is determined by a procedure similar to that for testing tensile strength. Two 1-inch by 2-inch pieces of membrane roofing material are prepared and are cleaned and/or primed if desired. A 1-inch by 1-inch piece of sealant is then applied to one end of a first piece of the membrane roofing material, and the second piece of membrane roofing material is aligned axially with the first piece and applied to overlap only that portion of the first piece which is covered by sealant. A lap joint is thus formed with the one square inch of sealant disposed between the two pieces of membrane roofing material. Uncoated ends of the membrane roofing material extend in opposite directions from the lap joint.

In order to ensure that the adhesive is bonded to the strips, a hand roller is then passed over the lap joint ten times. The free ends of the strips are gripped in the jaws of a tensile strength testing apparatus and pulled apart at the rate of two inches per minute. The force applied to the test sample during the spreading process is monitored and the force at rupture of the sample is the shear strength.

The peel strength is determined by a similar procedure. Two 1-inch by 3-inch pieces of EPDM or other membrane roofing material are prepared, and a 1-inch by 2-inch sample of the adhesive is applied to one end of the first strip. The second strip is then positioned directly above the first strip and a hand roller is passed over the sample ten times, using hand pressure, to ensure that the strips and adhesive are completely bonded. The free ends of the strips of membrane material, which extend from the same end of the sample are gripped in the jaws of the tensile strength testing apparatus and pulled apart at the rate of two inches per minute. The force applied to the sample is monitored until the sample has been completely peeled apart. The peel␣strenght is the average force applied to the sample during the peeling process.

The above described tests may readily be carried out by those skilled in the art, and the results of such tests may be used to guide the formulation of the adhesive composition of the present invention.

Adhesives having tensile strength, elongation, modulus at 300% elongation, modulus at failure, and shear and peel strength swell ratios within the ranges set forth above may be formulated by including in the compositions of the present invention 13–40% by weight of butyl rubber having a mole % unsaturation of between about 0.5 and 2.5, and by employing at least 2 phr of carbon black and about 0.5–6 phr of a quinoid cross linking agent. The remainder of such compositions are comprised of appropriate tackifying agents, block copolymers, fillers, pigments, and the like. Sealant compositions having physical properties as described above may also be formulated by employing 13–50% by weight of butyl rubber having a molecular weight greater than about 100,000 and a mole % unsaturation of between about 0.5 and 2.5, 5-25 phr of a phenolic resin curing agent, at least 3 phr of zinc oxide, with the remainder of the composition comprising tackifying agents and other modifiers.

Because the adhesive compositions described herein have the unique ability to resist oxidation and to remain stable and effective over a wide temperature range, and adhere to irregular surfaces they have numerous applications in the roofing industry as well as in other applications in addition to their utility as roofing adhesives. Since the environments to which a roofing adhesive is subjected is the most severe, the following examples relate the sealant composition to this environment for purposes of illustration. It will be understood that the ratio of the essential ingredients may be varied within the ranges set forth above and that other compounding materials may be replaced by and/or supplemented with such other materials as may be appropriate to deal with the environment contemplated.

Preferably, the adhesive composition is formed either as a single ply tape of about 0.03-0.05 inch thickness or as a two ply tape or cover strip comprising a layer of the adhesive composition backed by a sheet of EPDM roofing material or other membrane material. Such membrane material may be single calendered, of course, since the adhesive layer will seal any pinholes or other minor defects therein. In either of these configurations, the adhesive layer may be backed with a standard silicone coated release paper and rolled into a roll for transportation or storage.

The adhesive composition of the present invention may be used in a variety of ways in connection with membrane roofing material. FIG. 1 illustrates a lap joint formed between two parallel sheets of such material 1, 2. To form this lap joint, the sheets of membrane roofing material are laid out parallel to one another with their adjacent edges overlapping approximately two to four inches. The upper sheet 2 is then folded back so that it no longer overlaps the first sheet and the overlapping edges are cleaned and primed if desired. Solvents such as hexane, toluene or white gasoline may be used for cleaning the sheets of membrane roofing material 1, 2. Generally, the sheets of membrane roofing material are approximately 0.04-0.06 inches in thickness. A tape comprising a single layer of the adhesive material, which is preferably about 0.03 to 0.05 inches in thickness, is then applied along the edge of one of the sheets 1, 2. If the adhesive tape has been supplied in roll form with the adhesive composition backed by a release paper, the adhesive material 3 may be rolled onto the edge of one of the sheets 1, 2 as the backing paper is removed. The upper sheet 2 is then folded back into overlapping relation with the lower sheet 1 and a roller passed along the lap joint to ensure a good bond between the two sheets 1, 2 and the adhesive 3. Alternately, the tape could be applied, for example, to the lower sheet 1 with the backing paper adhered to its upper surface. The upper sheet 2 can then be folded back into overlapping relation and the two sheets 1, 2 and adhesive 3 pressed into engagement with a roller as the backing paper is peeled from the upper surface of the adhesive tape 3.

Figure 2:
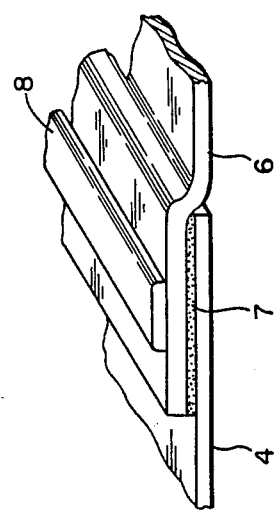
FIG. 2 is a perspective view of sheets of membrane roofing material which have been spliced using the adhesive tape of the present invention and illustrates one method of using a fastening bar with the present adhesive composition.

FIG. 2 illustrates another method of use of the adhesive tape of the present invention. As described above, once membrane roofing material has been spliced, fastening bars are used to maintain the spliced sheet of membrane roofing material in position on the roof. According to this method, a lap joint is formed between two adjacent sheets of membrane roofing material 4, 6. A layer of adhesive tape 7 is used to join these sheets 4, 6 to one another as described in connection with FIG. 3. A fastening bar 8 is then positioned along the lapped joint so that it overlies the layer of adhesive material 7. Fasteners such as nails or screws are then extended through the fastening bar 8 and overlapping sheets 4, 6 into the underlying roof structure. The layer of adhesive tape 7 serves not only to bond the two sheets of roofing material 4, 6 together, but also to seal the holes made by the fasteners.

FIGS. 3 and 4 depict two additional methods of fastening joined sheets of membrane roofing material to the underlying roof structure. According to this method, a lap joint is formed between overlapping sheets of membrane roofing material 9, 11 by a layer of adhesive tape 12 as described in connection with FIG. 1. A fastening bar 13 is then positioned along the lap joint with a layer of adhesive material 14 disposed between it and the upper surface of the overlapping sheet of membrane roofing material 11. Fasteners driven through the fastening bar into the underlying roof structure must thus pass through two layers of the adhesive material 12, 14 further reducing the likelihood of moisture penetrating through the holes made by the fasteners.

Figure 5:
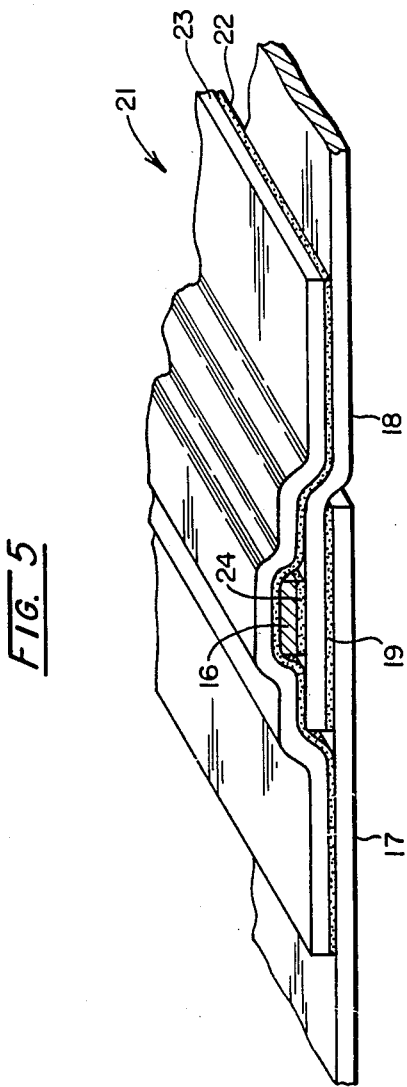
FIG. 5 is a perspective view of a sheet of membrane roofing material which has been spliced using the adhesive tape of the present invention and illustrates another method of using the two-ply cover strip with a fastening bar.

The method illustrated in FIG. 4 provides an even greater barrier to penetration of moisture. As in the embodiment of FIG. 2, a fastening bar 16 is positioned atop a lap joint formed by two sheets 17, 18 of membrane roofing material and a layer of adhesive tape 19. Fasteners are extended through the fastening bar 16, the two sheets 17, 18 and the adhesive tape 19 and into the underlying roof structure. A cover strip 21, comprising a layer of the adhesive composition 22 applied to a strip of the membrane roofing material 23 is then used to cover the fastening bar and the joint between the two sheets of membrane roofing material 17, 18. The method illustrated by FIG. 5 is identical to that of FIG. 4, with the exception that a layer of adhesive tape 24 is interposed between the fastening bar 13 and the upper sheets of membrane roofing material 12.

It will be apparent to those skilled in the art that the adhesive composition and cover strip described above may be used equally for applying new roofing and for repairing existing roof structures.

The adhesive compositions of the following examples were prepared by combining the ingredients listed in Table IV in the proportions indicated, all proportions being given by dry weight unless otherwise indicated.

TABLE I

|  | A | B | C | D | E | F | G |
| --- | --- | --- | --- | --- | --- | --- | --- |
| Butyl Rubber[1] | 35 | 35 | 35 | 35 | 35 | 35 | 35 |
| Piccotac[2] | 5 | 5 | — | — | — | — | — |
| H-300[3] | 49 | 44 | 54 | 49 | 46 | 54 | 54 |
| SP 1068[4] | — | — | — | 5 | 5 | — | — |
| Dioctyl Azelate | — | 5 | — | — | 3 | — | — |
| Carbon Black | 2 | 2 | 2 | 2 | 2 | 2 | 2 |
| ZnO | 9 | 9 | 9 | 9 | 9 | 9 | 9 |
| S (phr) | 1 | 1 | 1 | 1 | 1 | 1 | 1 |
| Mercaptobenzothiazole (phr) | — | 2 | — | 3 | 5 | — | 5 |
| Para-Quinone Dioxime (phr) | 2 | 2 | 2 | 2 | 2 | 2 | 1 |
| Benzoyl Peroxide (phr) | — | — | — | 6 | 6 | 3 | 1.5 |
| T-Butyl | 12 | 12 | 12 | — | — | — | — |

TABLE I-continued

|  | A | B | C | D | E | F | G |
|---|---|---|---|---|---|---|---|
| Perbenzoate (phr) | | | | | | | |

[1] The butyl rubber used was a mixture composed of 69% Butyl 165 and 31% Butyl 365.
[2] A hydrocarbon resin having a softening point of 97° C. is available from Hercules, Incorporated under the trademark "Piccotac B".
[3] A polybutene having an average molecular weight of 1290 available from AMOCO under the trademark "H-300"½
[4] SP 1068 is a phenolic thermoplastic tackifier sold by Schenectady Chemicals, Inc.

EXAMPLES I-III

Samples of the adhesive composition were prepared according to Formulas A, B and C of Table I. Adhesive tape of 0.05 inch thickness was prepared from each of these samples and cured at ambient temperature for one day and at 158° F. The samples were then tested at ambient temperature for tensile strength, elongation, modulus at 300% elongation, modulus at failure, and shear and peel strength. EPDM sheeting was used in testing the peel and shear strengths of the samples. Since the EPDM material used in the testing of samples I-III was relatively clean, hexane cleaning was deemed unnecessary. All other samples, however, were applied to EPDM sheeting which had been cleaned with hexane. The shear and peel tests were also performed using EPDM membrane which had been treated with primer. The results of these tests are set forth in Table II. The tensile and shear strengths are given in psi, the elongation in percent and the peel strength in pounds per inch. The peel strength of the samples is given in pounds per inch and the shear strength in pounds per square inch.

TABLE II

| | | | | | Unprimed | | Primed | |
|---|---|---|---|---|---|---|---|---|
| Example | T | E | $M_{300}$ | $M_f$ | Peel | Shear | Peel | Shear |
| 1 | 62 | 1719 | 2.05 | 3.58 | 5.0 | 15.4 | 9.5 | 39 |
| 2 | 56 | 1396 | 2.13 | 4.00 | 3.1 | 14.4 | 9.0 | 38.5 |
| 3 | 67 | 1312 | 2.54 | 5.08 | 3.4 | 14.5 | 9.0 | 41 |

The samples of these examples had lower than normal values for shear and peel strength. As mentioned above, however, the EPDM membrane used for testing the peel and shear strengths, was not cleaned prior to application of the adhesive composition and thus the lower values are expected. The testing of these three samples also demonstrates the benefits of priming the EPDM roofing material. The primer, distributed by Hughson Chemicals, Lord Corporation, under the trademark TS 3320-19 was diluted to 20% strength by weight with hexane prior to use. The resultant increases in both the shear and peel strengths of the adhesive were quite significant.

It should be noted from these examples that adjustments made to the kinds and quantities of tackifiers and plasticizers used in the sealant resulted in changes in the physical properties of the sealant. For example, the formulations A and C differ only in that formulation C contains an additional five parts of polybutene in lieu of the five parts of Piccotac used in formulation A. As a result, the tensile strength of the sample of Example III was greater than that of Example I, and elongation of the sample of Example III was less than that of sample I. Of course, such an increase in the tensile strength and decrease in elongation resulted in an increase in both the modulus at 300% elongation and the modulus at failure.

EXAMPLE IV

A sample was prepared according to formulation D of Table I in a layer of 0.05 inch thickness and cured at 158° F. for one day. This example differs from the previous examples in its use of the tackifier SP 1068 and in its use of benzoyl peroxide as the curing agent. This sample had a tensile strength of 99, an elongation of 1333, a modulus at 300% elongation of 5.74, and a modulus at failure of 7.40. The peel strength of the sample was 7.5 pounds per inch, and the shear strength 33.5 pounds per square inch at ambient temperature when applied to hexane cleaned but unprimed membrane. This formulation thus satisfies the criteria for an acceptable adhesive composition.

EXAMPLE V

A sample of the adhesive composition was compounded according to formulation E of Table I and prepared and cured in like manner to the adhesive tape of Example IV. The formulation of the tape of this example differs from that of the preceding example in that a small amount of the polybutene tackifier has been replaced by an equal amount of dioctyl azelate. In addition, the amount of mercaptobenzothiazole has been increased. The tensile strength of this sample was 82 psi, the elongation was 1180%, the modulus at 300% elongation was 7.40, and the modulus at failure was 7.06. The peel strength of the adhesive tape was 7 psi, and the shear strength 30.5 psi when applied to hexane cleaned but unprimed membrane. As with Examples I and III, the replacement of polyisobutylene with dioctyl azelate has been accompanied by decreases in the tensile strength and elongation, as well as in peel and shear strength. The physical properties are within the preferred ranges however and as such the adhesive of this example would function acceptably.

EXAMPLE VI

An adhesive tape was prepared in accordance with the preceding two examples using formulation F of Table I. This formulation does not include the SP 1068 tackifier, but rather uses an increased amount of polybutene tackifier. The tensile strength of the sample was 139 psi, the elongation 973%, the modulus at 300% elongation was 5.60, and the modulus at failure 14.3. The peel strength of the adhesive was 4 pounds per inch, and the shear strength 25 pounds per inch when applied to hexane cleaned but unprimed membrane. Again, an acceptable adhesive composition may be prepared as per this example, even though the elongation is below the most preferred value.

EXAMPLE VII

An adhesive tape was prepared as in the preceding three examples using formulation G of Table I. This adhesive composition differs from that of Example VI in that it includes only half the cross-linking agent and cross-link activator. As a result, this sample is not as highly cross-linked as the sample of Example VI. Accordingly, the tensile strength is only 61 psi, and the elongation has increased to 1515%. The modulus at 300% elongation is 2.02, and the modulus at failure is 3.99. The peel strength of the sample was 5.3 pounds per inch, and the shear strength 16.18 psi when applied to hexane cleaned but unprimed membrane. The composition of this example is this usable as a suitable roofing adhesive.

I claim:

1. A monolayer membrane roofing material with joint laminate which comprises two monolayer sheets of non-tacky, non-adhesive, fully cured elastomeric roofing membrane material, overlapped along a relatively small section of their total width, a tapelike adhesive layer adapted to be disposed only between the overlapped sections of the sheets, adhesive layer comprising a permanently tacky cured butyl rubber based composition comprising the reaction product of butyl rubber, a crosslinking system for said butyl rubber, a tackifier compatible with butyl rubber and a filler material, the concentrations of said constituents being chosen such that said composition has a tensile strength of at least 50 psi, an elongation of at least 600%, a modulus at 300% elongation of not more than 12, a modulus at failure of not more than 20, the laminate exhibiting a shear strength of at least 15 psi and a peel strength of at least 2 pounds per linear inch.

2. The laminate of claim 1 wherein said composition comprises zinc oxide and a sulfur constituent whereby the resistance of the layer to heat aging is improved.

3. The laminate of claim 1 wherein the butyl rubber portion of said composition comprises 13–50% by weight of said composition exclusive of the cross-linking system and any sulphur constituent.

4. The laminate of claim 3 wherein the cross-linking system for said composition comprises a quinoid cross-linking agent and an activator for said cross-linking agent.

5. The adhesive tape of claim 4 wherein the cross-linking agent is p-quinone dioxime present in an amount less than about six parts by weight per hundred parts butyl rubber.

6. The adhesive tape of claim 5 wherein the butyl rubber portion of said composition comprises 13–40% by weight of said composition exclusive of the cross-linking system and any sulfur constituent.

7. The adhesive tape of claim 3 wherein the cross-linking system for said composition includes 5–25 parts of a phenolic cross-linking agent per hundred parts butyl rubber.

8. The adhesive tape of claim 1 wherein said layer further comprises flexible membrane layer adhered to one side of said composition layer.

9. The laminate of claim 1 wherein the concentration of the constituents of said composition is chosen such that said composition has tensile strength of at least 60 psi, an elongation of at least 800%, a modulus at 300% elongation of not more than 8 and a modulus at failure of not more than 16.

10. The laminate of claim 2 wherein said sulfur constituent comprises sulfur and mercaptobenzothiazole.

11. The laminate of claim 2 wherein the sulfur constituent is present in an amount equivalent to at least 0.5 parts sulfur per hundred parts butyl rubber; and wherein said composition is compounded such that substantially all cross-linking of the butyl rubber is accomplished by said cross-linking system.

* * * * *